Sept. 16, 1930.  P. J. THOMAS  1,775,741
AUTOMATIC SHAFT COUPLING
Filed Feb. 10, 1930  6 Sheets-Sheet 3

Paul Joseph Thomas
INVENTOR:
By [signature]
his Attorney.

Paul Joseph Thomas
INVENTOR;

Sept. 16, 1930.    P. J. THOMAS    1,775,741
AUTOMATIC SHAFT COUPLING
Filed Feb. 10, 1930    6 Sheets-Sheet 5

Paul Joseph Thomas
INVENTOR;
By
his Attorney.

Sept. 16, 1930.   P. J. THOMAS   1,775,741
AUTOMATIC SHAFT COUPLING
Filed Feb. 10, 1930   6 Sheets-Sheet 6

Paul Joseph Thomas
INVENTOR;
By Otto Munk
his Attorney.

Patented Sept. 16, 1930

1,775,741

UNITED STATES PATENT OFFICE

PAUL JOSEPH THOMAS, OF NARBONNE, FRANCE

AUTOMATIC SHAFT COUPLING

Application filed February 10, 1930, Serial No. 427,250, and in France February 15, 1929.

The object of the present invention is to effect the entrainment of a driven member after a certain range of lost motion of a driving member.

Another object of the present invention is to transmit the rotary movement of a driving shaft to a driven shaft by a coupling contrivance acting automatically under the influence of centrifugal force.

An automatic coupling contrivance enabling the above objects to be attained has the features set forth in the following description and defined in the claims annexed to the end thereof.

The preferred form of the invention is illustrated by way of example on the accompanying drawings, in which:—

Figure 5:
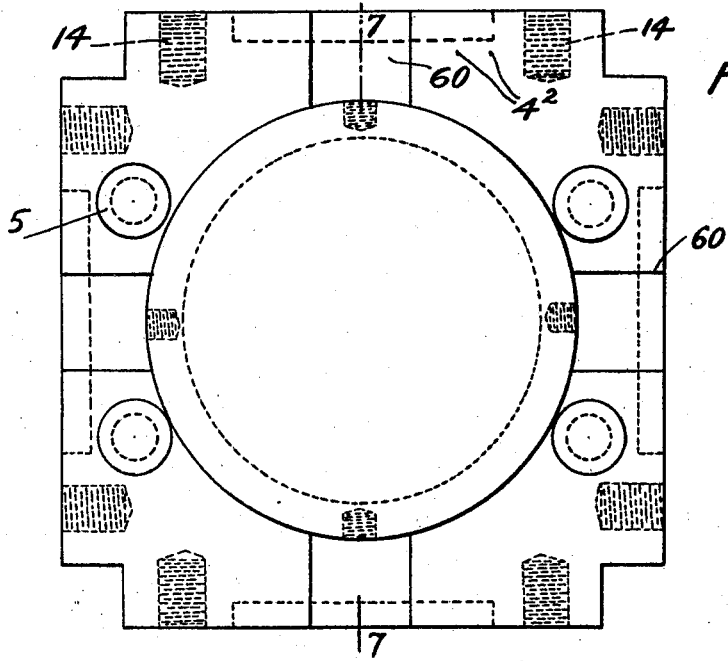
Figs. 5, 6 and 7 are respectively an elevation, a side elevation and a transverse section of cheek plates assembled to form the casing.
Figure 7:
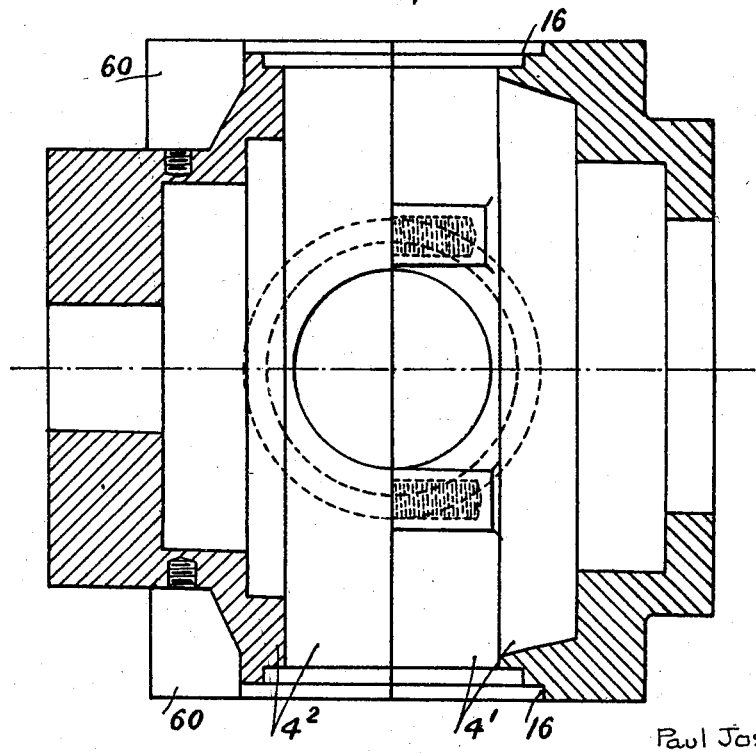
Figure 6:
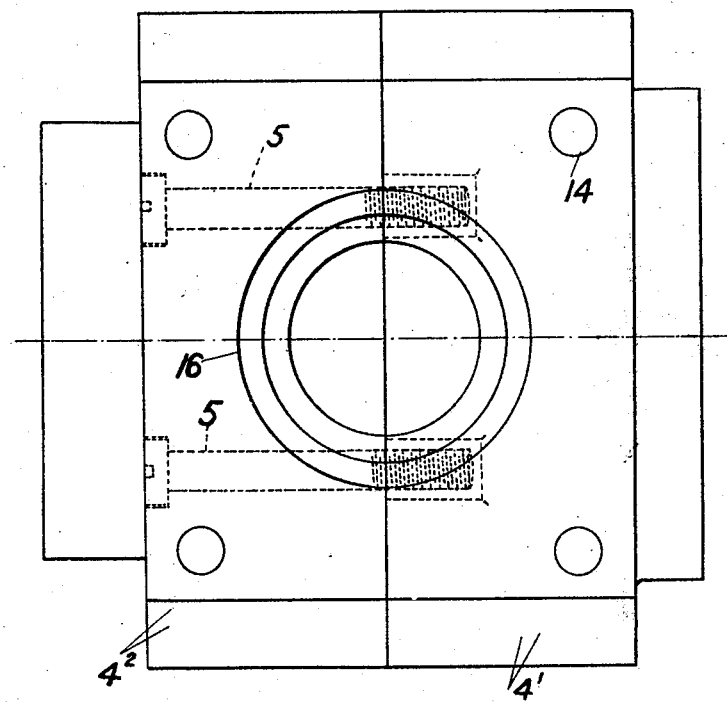
Figure 10:
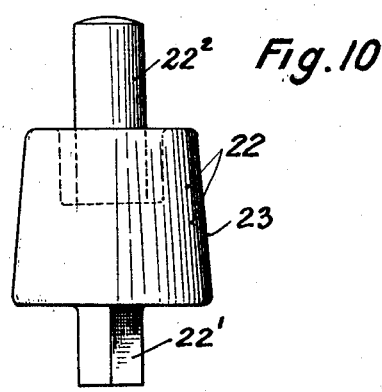
Figs. 10 and 11 are an elevation and a plan of the shaft of a planet wheel.
Figure 11:
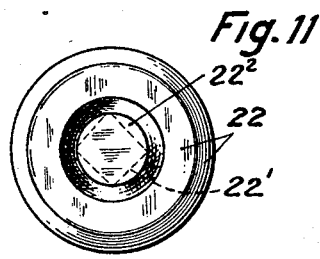

The driving shaft 1 and the driven shaft 2 are mounted freely in a coupling contrivance 3 constituted in the following manner:

Two rotary cheek plates $4^1$, $4^2$ (Figs. 5 to 7) are connected together by a transverse screw 5. The assemblage of these two cheek plates thus forms a casing within which are located on the one hand the driving shaft 1 at the end of which is keyed a first sun wheel 6, and on the other hand the driven shaft 2 at the end of which is keyed a second sun wheel 7.

Figure 3:
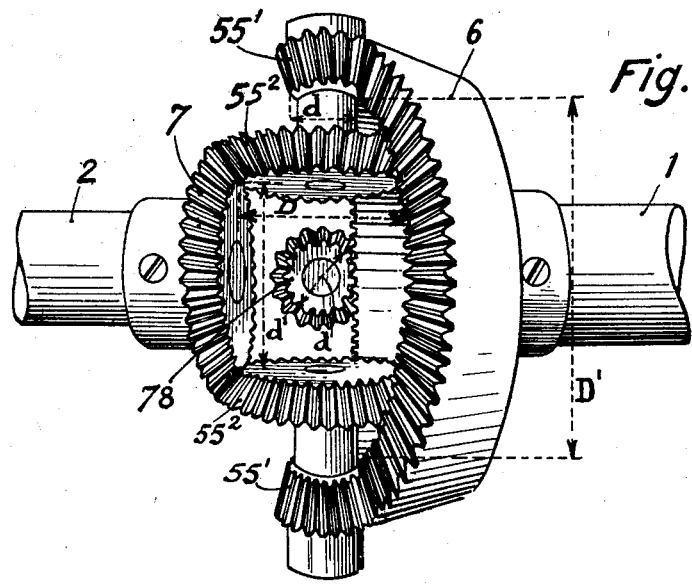
Fig. 3 is a view showing the arrangement of the gears within the casing.
Figure 4:
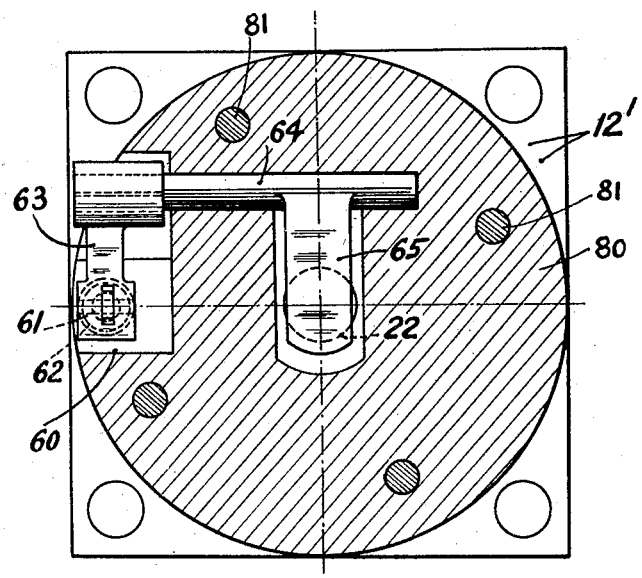
Fig. 4 is a transverse section of a cover along the line 4—4 of Fig. 2.

Between the sun wheels 6 and 7 keyed respectively on each of the shafts 1 and 2 are interposed sets of planet wheels arranged in the following manner:

As can be seen more particularly in Fig. 3, two sets of planet wheels comprising each an external planet wheel $55^1$ of a diameter $d$ and an internal planet wheel $55^2$ of a diameter $D$, said planet wheels being engaged on the one hand by their external planet wheel $55^1$ with the sun wheel 6 of the driving shaft of a diameter $D^1$ and on the other hand by their internal planet wheel $55^2$ with the sun wheel 7 of the driven shaft of a diameter $d^1$.

Moreover two simple planet wheels 78 of a diameter $d$ are in engagement with the sun wheel 6 of the driving shaft.

Figure 2:
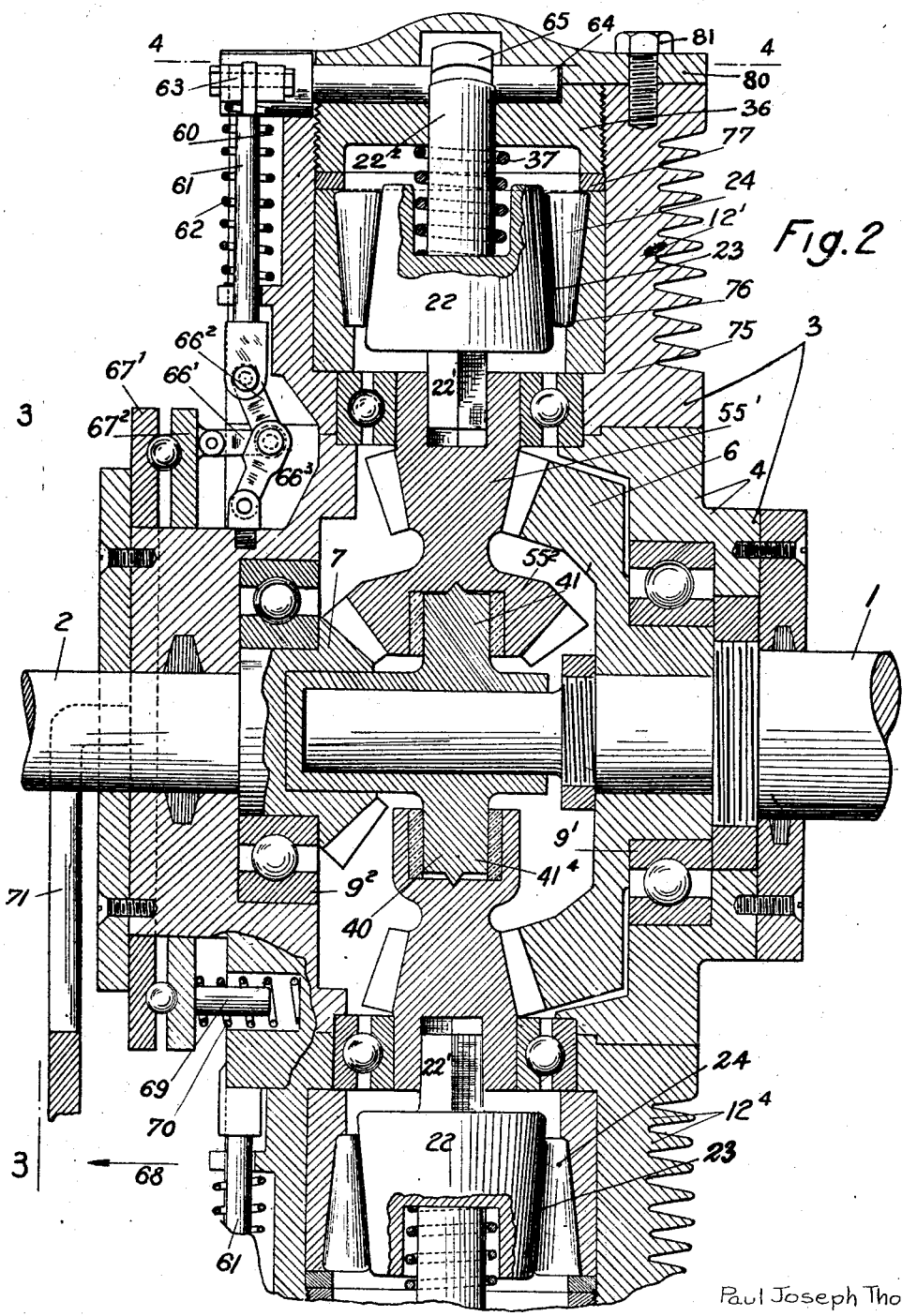
Fig. 2 is a longitudinal section of this contrivance along the broken line 2—2—2 of Fig. 1.
Figure 12:
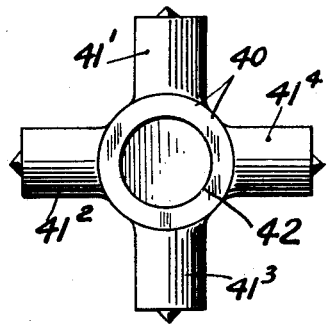
Figs. 12 and 13 are an elevation and side view of a cross for the assemblage of planet wheels.
Figure 8:
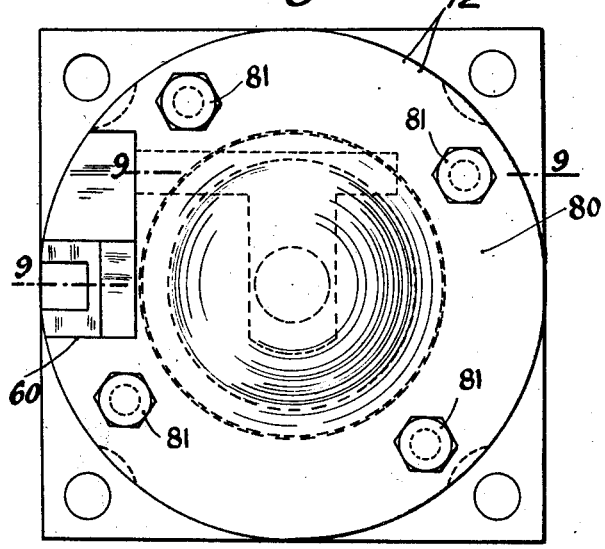
Figure 13:
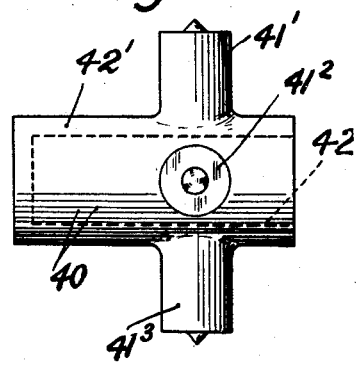

All these planet wheels are mounted on one and the same central cross 40 (Figs. 12 and 13); this cross 40 has on the one hand limbs $41^1$, $41^2$, $41^3$, $41^4$ on which the sets of planet wheels are centered and on the other hand it has a bore 42 in which turns the extremity of the driving shaft 1, whilst the sun wheel 7 of the driven shaft 2 is likewise centered on a lateral limb $42^1$ of this cross 40 (Fig. 2).

Figure 1:
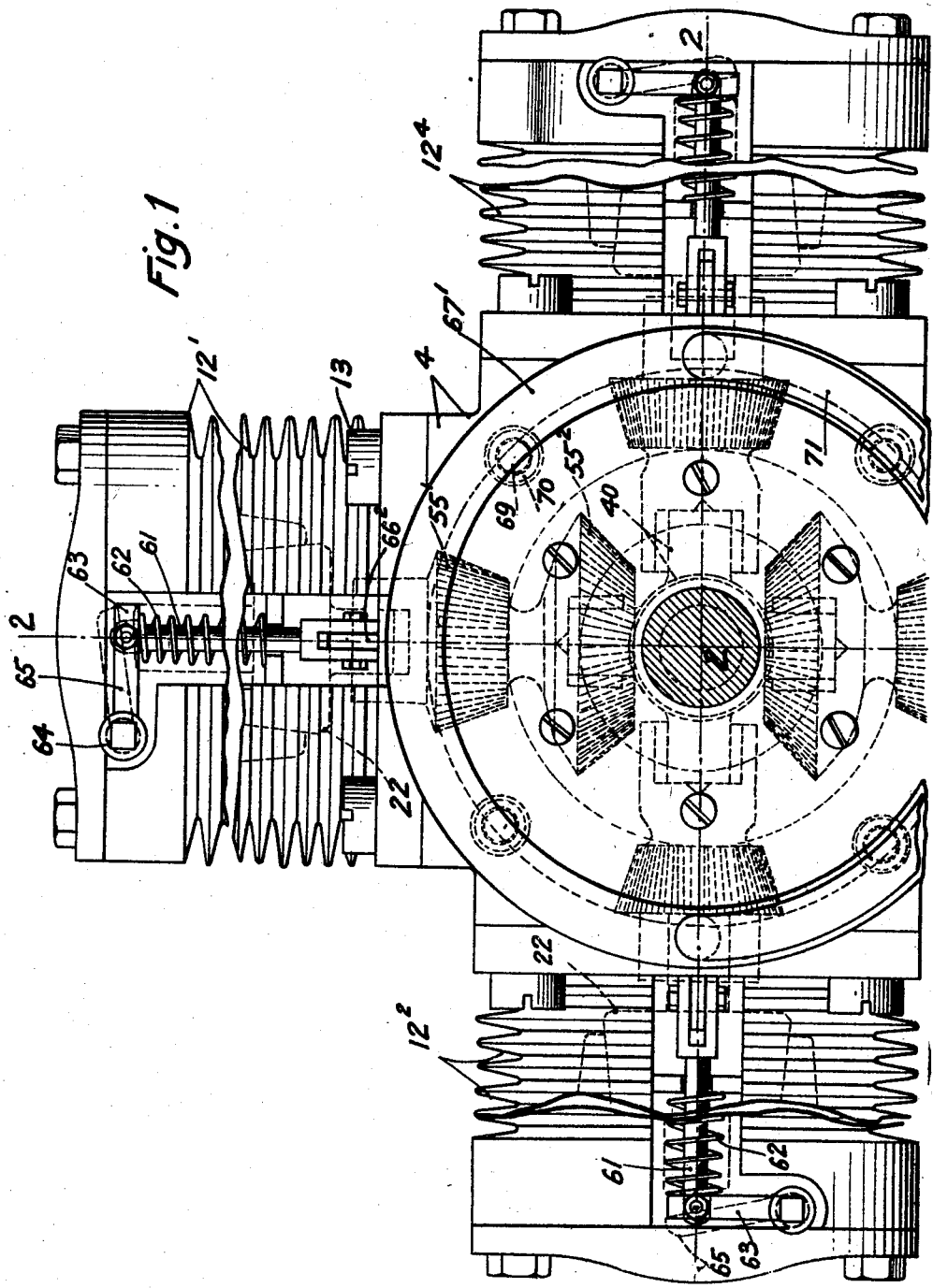
Fig. 1 is an elevation of a coupling contrivance according to the invention.
Figure 9:
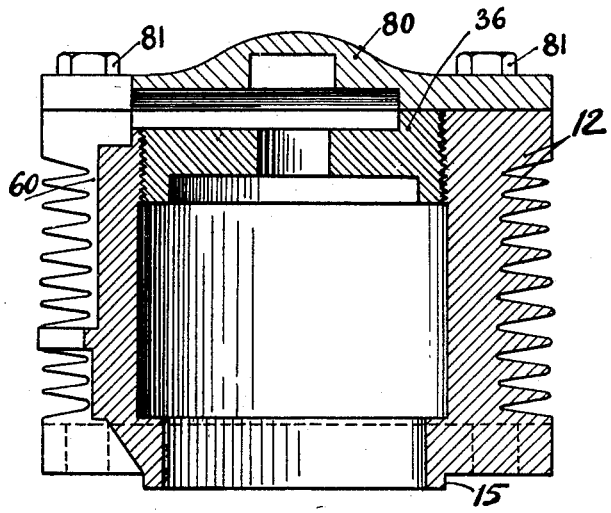
Figs. 8 and 9 are a plan and a longitudinal section along the line 9—9 of Fig. 8, of a block.

On the casing formed by the cheek plates $4^1$ $4^2$ are fixed the blocks $12^1$, $12^2$, $12^3$, $12^4$ (Fig. 1) in which are mounted the shafts of the planet wheels; these blocks have a square base (Figs. 7 and 9) and are fixed at their corners by screws 13, these screws engage in screw-threaded holes 14 provided for this purpose on the body of the cheek plates $4^1$, $4^2$; a shoulder 15 formed at the lower portion of the block 12 engages in a corresponding socket 16 formed in the cheek plates $4^1$, $4^2$ thus ensuring the centering of the block relatively to the rotary cheek plates $4^1$ $4^2$.

The sun wheels 6 and 7 as well as the planet wheels are mounted preferably in the casing 4 by the aid of ball bearings 9, these ball bearings bearing against abutments formed in the cheek plates $4^1$ $4^2$ constituting the casing (Fig. 2).

Each set of planet wheels $55^1$ $55^2$ or each planet wheel 78 driven by the sun wheel 6 of the driving shaft drives a shaft 22 which turns with such planet wheel but which can slide relatively thereto along its longitudinal axis.

For this purpose the shaft 22 of the planet wheel ends in a square $22^1$ by which it engages in a hollow of the same section provided in the body of the planet wheel (Fig. 2).

The shaft 22 has a recessed form forming a head. This shaft 22 has an external conical surface 23, the apex of the cone being located outwardly. This surface is in engagement with conical rollers 24 arranged as a crown in each block 12.

Each block 12 receives for this purpose a ring 75 having a conical internal surface presenting a shoulder 76. The rollers rest on this shoulder 76 and are maintained by an applied washer 77. A screwthreaded plug 36 clamps the whole in the block 12.

The conical shaft 22 is urged towards its planet wheel by a spring 37 threaded over a prolongation $22^2$ of the shaft 22, such spring bearing against the base of the plug 36.

The end $22^2$ of the shaft 22 traverses the plug 36 for the purpose explained later.

Finally a cap 80 fixed by screws 81 closes the extremity of each block $12^1$, $12^2$ . . . .

A safety device controlled externally by the mechanician is likewise provided on the preceding contrivance; this is constituted as follows:

Each block $12^1$, $12^2$, $12^3$, $12^4$ has a guide groove 60 in which a rod 61 slides, urged by a returning spring 62; this rod operates by a crank 63, a shaft 64 engaged in the head of the block and carrying an actuating finger 65 capable of coming into engagement with the end of the shaft 22 of the planet wheels.

The operating rod 61 urged by its spring 62 acts on the crank 63 in such manner that the actuating finger 65 disengages itself from the end of the shaft 22 and allows it freedom of movement.

All the rods 61 located on all of the blocks $12^1$, $12^2$ . . . are actuated by a single control.

For this purpose the end of the rod 61 is articulated by the intermediary of a set of links $66^1$ $66^2$ $66^3$ on the internal annulus $67^2$ of a ball thrust bearing $67^1$, $67^2$.

This annulus $67^1$ $67^2$ is normally thrust in the direction of the arrow 68 by springs 70 on pins 69 arranged around the border of the casing 4.

A clutch fork 71 sliding on the shaft 2 can come into engagement with the annulus $67^1$ by the action of an external member operated by the mechanician.

The coupling contrivance 3 of the shafts 1 and 2 being thus constituted, its operation is as follows:

When the driving shaft 1 is set in motion it carries with it in its rotation its sun wheel 6. This latter drives the whole coupling contrivance 3 by means of the external planet wheels $55^1$, 78 . . . which are in engagement with the sun wheel 6. The driven shaft 2 which offers a certain resistance to the rotation remains still on the setting in motion of the driving shaft 1. The planet wheels $55^2$ turning with their shaft 22 roll on the sun wheel 7 of the driven shaft 2.

In consequence of the difference of diameter between the two planet wheels $55^1$ $55^2$ it follows that the driving effect of the shaft 1 is multiplied while the resistance offered by the driven shaft 2 is on the contrary demultiplied.

It results from this that the drive of the casing 3 will be so much the more spontaneous and more rapid the greater the difference between D and $d$.

Under the action of centrifugal force the shafts 22 tend to move away from their planet wheels while compressing their springs 37.

When this force is sufficiently great to overcome the resistance opposed by the springs 37, the shafts 22 become more and more progressively wedged by their conical portions 23 in the ring of conical rollers 24 in accordance with the acceleration of motion. The complete wedging of the shafts 22 in relation to the rollers 24 causes at such moment the rotation of the driven shaft 2 by the driving shaft 1.

In effect, the shafts 22 being wedged, they oppose the rotation of their planet wheels such that these latter which are in engagement with the sun wheels 6 and 7 thus form coupling members between these two sun wheels, coupling the shafts 1 and 2 and effecting in consequence the driving of the shaft 2 by the driving shaft 1.

As soon as the speed of rotation of the driving shaft decreases, the springs 37, compressed during the driving period, expand and bring back the shafts 22 towards their respective planet wheels, these shafts 22 then release the rollers 24 and can then turn freely with their planet wheels which roll anew on the sun wheel 7 until complete stoppage of the driving shaft 1.

On the other hand the safety device operated by the fork 71 enables the driven shaft 2 to be stopped at the desired moment without having need for this to arrest the rotation of the driving shaft 1. Its operation is as follows:

Normally the springs 70 thrust the pins 69 in the direction of the arrow 68; the links $66^1$ drawn by the annulus $67^2$ themselves pull on the articulation of the links $66^2$ and $66^3$ which stand up and thrust the rods 61 in such manner that these rods having no action on the shafts 22 of the planet wheels permit these latter to displace themselves freely and to become wedged against the rollers 24 by the action of the driving contrivance.

On the contrary if the mechanician desires to stop the driven shaft 2 whilst leaving the driving shaft 1 to turn, he operates the clutch fork 71 so that this fork 71 thrusts the outer annulus 67 in the inverse direction to 68.

By this action the toggle formed by the links 66² and 66³ folds and withdraws the rods 61.

Under this action, the actuating finger 65 is applied to the extremity of the shaft 22 of the planet wheels and disengages same from the rollers 24.

At this moment, the planet wheels 55¹ and 55² driven by the sun wheel 6 are freed relatively to the blocks 12¹ 12² ... and the planet wheels 55² roll freely on the sun wheel 7 of the shaft 2 which then can stop.

Claims:

1. In an automatic coupling between a driving shaft (1) and a driven shaft (2), a first sun wheel (6) fast with the driving shaft (1), a second sun wheel (7) fast with the driven shaft (2), planet wheels (55¹ 55²) interposed between said sun wheels (6, 7), a shaft (22) fast in rotation with said planet wheels (55¹ 55²) but capable of sliding relatively to said planet wheels under the influence of centrifugal force, said shaft (22) having a conical external surface (23), a ring of conical rollers (24) wedging the shaft (22) on its displacement under the action of centrifugal force, this arrangement effecting the progressive entrainment of the driven shaft (2) by the driving shaft (1) in accordance with the displacement and wedging of the shaft (22) under the influence of centrifugal force, the complete wedging against the conical rollers (24) of the conical surface (23) of said shaft (22) corresponding to direct engagement between the driving shaft (1) and the driven shaft (2).

2. In an automatic coupling between a driving shaft (1) and a driven shaft (2), a first sun wheel (6) fast with the driving shaft (1), a second sun wheel (7) fast with the driven shaft (2), planet wheels (55¹ 55²) interposed between said sun wheels (6, 7), a mobile member (22) fast in rotation with said planet wheels and displaceable under the influence of centrifugal force, a returning member (36) bringing the mobile member (22) back to its initial position on the influence of centrifugal force decreasing, a stopping member (24) locking said mobile member on its displacement under the influence of centrifugal force, this arrangement effecting the progressive entrainment of the driven shaft (2) by the driving shaft (1) in accordance with the displacement and locking of the mobile member (22) under the influence of centrifugal force, the complete locking of said mobile member corresponding to direct engagement between the driving shaft (1) and the driven shaft (2), on the contrary when the driving shaft (1) slows down in order to stop, the returning member (36) brings back the mobile member (22) to its initial position as soon as the influence of centrifugal force is less than the force opposed by said returning member (36).

3. In an automatic coupling between a driving shaft (1) and a driven shaft (2), a first sun wheel (6) fast with the driving shaft (1), a second sun wheel (7) fast with the driven shaft (2), planet wheels (55¹ 55²) interposed between said sun wheels (6, 7) a shaft (22) fast in rotation with said planet wheels (55¹ 55²) but capable of sliding relatively to said planet wheels under the influence of centrifugal force, a head fast with said shaft (22) and displacing therewith under the influence of centrifugal force, a stopping member (24) locking said head and said shaft on their displacement under the influence of centrifugal force, this arrangement effecting the progressive entrainment of the driven shaft (2) by the driving shaft (1) in accordance with the displacement and locking of the mobile member (22) under the action of centrifugal force, the complete locking of said mobile member corresponding to direct engagement between the driving shaft (1) and the driven shaft (2).

4. In an automatic coupling between a driving shaft (1) and a driven shaft (2), a first sun wheel (6) fast with the driving shaft (1) a second sun wheel (7) fast with the driven shaft (2), said second sun wheel (7) having a diameter ($d^1$) smaller than that ($D^1$) of the first sun wheel (6), sets of two planet wheels (55¹, 55²) also of different diameters (D, d), one (55¹) being in engagement with the sun wheel (6) of the driving shaft (1), the other (55²) being in engagement with the other sun wheel (7) of the driven shaft (2), simple planet wheels (78) alternated with the sets of double planet wheels (55¹ 55²), said simple planet wheels (78) being in engagement solely with the sun wheel (6) of the driving shaft (1), a mobile member fast in rotation with each set of double planet wheels (55¹ 55²) and with each set of simple planet wheels (78), said mobile member (22) displacing under the action of centrifugal force, stopping members (24) locking said mobile members (22) on their displacement under the influence of centrifugal force, this arrangement effecting the progressive entrainment of the driven shaft (2) by the driving shaft (1) in accordance with the displacement and locking of the mobile members (22) under the influence of centrifugal force, the complete locking of said mobile members (22) corresponding to direct engagement between the driving shaft (1) and the driven shaft (2).

5. In an automatic coupling between a driving shaft (1) and a driven shaft (2), a casing (4) constituted by two rotary cheek plates (4¹ 4²) assembled by transverse screws (5), said casing (4) being mounted freely on the two driving (1) and driven (2) shafts, blocks (12¹ 12²) mounted on said casing and communicating therewith, a first sun wheel (6) fast with the driving shaft (1), a second sun wheel (7) fast with the driven shaft (2), said two sun wheels being mounted respectively in the cheek plates ($4^1$ $4^2$) of said casing, planet wheels ($55^1$) interposed between said sun wheels (6, 7), said planet wheels being mounted likewise in said casing ($4^1$ $4^2$), mobile members (22) in engagement with the planet wheels ($55^1$) and displacing under the influence of centrifugal force in the blocks ($12^1$ $12^2$) fast with the casing ($4^1$ $4^2$), stopping members (24) fixed in said blocks ($12^1$ $12^2$) and locking the mobile members (22) on their displacement under the influence of centrifugal force, this arrangement effecting the progressive entrainment of the driven shaft (2) by the driving shaft (1) in accordance with the displacement and locking of the mobile members (22) under the influence of centrifugal force, the complete locking of said mobile members (22) corresponding to direct engagement between the driving shaft (1) and the driven shaft (2).

6. In an automatic coupling between a driving shaft (1) and a driven shaft (2), a casing (4) constituted by two rotary cheek plates ($4^1$ $4^2$) assembled by transverse screws (5), said casing (4) being freely mounted on the two driving (1) and driven (2) shafts, blocks ($12^1$ $12^2$) mounted on said casing and communicating therewith, a first sun wheel (6) fast with the driving shaft (1), a second sun wheel (7) fast with the driven shaft (2), said two sun wheels being mounted respectively in the cheek plates ($4^1$ $4^2$) of said casing, planet wheels ($55^1$) interposed between said sun wheels (6, 7), said planet wheels being mounted likewise in said casing ($4^1$ $4^2$), shafts (22) located in said blocks ($12^1$ $12^2$) fast in rotation with said planet wheels ($55^1$ $55^2$), but capable of sliding relatively to said planet wheels under the influence of centrifugal force, said shafts having a conical external surface (23), rings of conical rollers (24) mounted in said blocks ($12^1$ $12^2$) and wedging the shafts (22) on their displacement under the influence of centrifugal force, this arrangement effecting the progressive entrainment of the driven shaft (2) by the driving shaft (1) in accordance with the displacement and wedging of the shafts (22) under the influence of centrifugal force, the complete wedging in the rings of conical rollers (24) of the conical surface (23) of said shafts (22) corresponding to direct engagement between the driving shaft (1) and the driven shaft (2).

7. In an automatic coupling between a driving shaft (1) and a driven shaft (2), a first sun wheel (6) fast with the driving shaft (1), a second sun wheel (7) fast with the driven shaft (2), planet wheels ($55^1$ $55^2$) interposed between said sun wheels (6, 7), a mobile member (22) fast in rotation with said planet wheels and displacing under the influence of centrifugal force, said mobile member (22) having a conical external surface, a ring of conical rollers (24) in engagement with the conical external surface of the mobile member wedging the mobile member (22) on its displacement under the influence of centrifugal force, this arrangement effecting the progressive entrainment of the driven shaft (2) by the driving shaft (1) in accordance with the displacement and locking of the mobile member (22) under the influence of centrifugal force, the complete locking of said mobile member corresponding to direct engagement between the driving shaft (1) and the driven shaft (2), a shoulder (76) cooperating to hold the conical rollers (24), a fixed ring (75) serving to support the conical rollers and having a washer (77) applied and fixed on the fixed ring (75), said washer also cooperating to hold the conical rollers.

8. In an automatic coupling between a driving shaft (1) and a driven shaft (2), a casing (4) constituted by two rotary cheek plates ($4^1$ $4^2$) assembled by transverse screws (5), said casing (4) being freely mounted on the two driving (1) and driven (2) shafts, blocks ($12^1$ $12^2$) mounted on said casing and communicating therewith, a first sun wheel (6) fast with the driving shaft (1), a second sun wheel (7) fast with the driven shaft (2), said two sun wheels being mounted respectively in the cheek plates ($4^1$ $4^2$) of said casing, planet wheels ($55^1$) interposed between said sun wheels (6, 7), said planet wheels being likewise mounted in said casing ($4^1$ $4^2$), shafts (22) located in said blocks ($12^1$ $12^2$) and fast in rotation with said planet wheels ($55^1$ $55^2$) but capable of sliding relatively to said planet wheels under the influence of centrifugal force, said shafts having a conical external surface (23), rings of conical rollers (24) mounted in said blocks ($12^1$ $12^2$) and wedging the shafts (22) on their displacement under the influence of centrifugal force, returning springs (36) also located in the blocks ($12^1$ $12^2$) bringing back the shafts (22) when the influence of centrifugal force ceases, this arrangement effecting the progressive entrainment of the driven shaft (2) by the driving shaft in accordance with the displacement and wedging of the shafts (22) under the influence of centrifugal force, the complete wedging in the conical rollers (24) of the conical surface (23) of said shafts (22) corresponding to direct engagement between the driving shaft (1) and the driven shaft (2), on the contrary when the driving shaft slows down to stop, the returning spring (36) brings back the shafts (22) to their initial position as soon as the influence of centrifugal force is less than the force opposed by the returning springs (36).

9. In an automatic coupling between a driving shaft (1) and a driven shaft (2), a first sun wheel (6) fast with the driving shaft (1), a second sun wheel (7) fast with driven shaft (2), planet wheels (55¹) interposed between the said sun wheels (6, 7), an assembling cross (40) having limbs (41¹ 41²) on which are centered said planet wheels, said cross having also a bore (42) and a lateral journal (42¹) for centering the planet wheels (55¹) and displacing under the influence of centrifugal force, stopping members (24) locking said mobile members (22) on their displacement under the influence of centrifugal force, this arrangement effecting the progressive entrainment of the driven shaft (2) by the driving shaft (1) in accordance with the displacement and locking of the mobile members (22) under the influence of centrifugal force, the complete locking of said mobile members (22) corresponding to direct engagement between the driving shaft (1) and the driven shaft (2).

10. In an automatic coupling between a driving shaft (1) and a driven shaft (2), a first sun wheel (6) fast with the driving shaft (1), a second sun wheel (7) fast with the driven shaft (2), planet wheels (55¹ 55²) interposed between the said sun wheels (6, 7), a mobile member (22) fast in rotation with said planet wheels and displacing under the action of centrifugal force, a stopping member (24) locking said mobile member on its displacement under the action of centrifugal force, this arrangement effecting the progressive entrainment of the driven shaft (2) by the driving shaft (1) in accordance with the displacement and locking of the mobile member (22) under the influence of centrifugal force, the complete locking of said mobile member corresponding to direct engagement between the driving shaft (1) and the driven shaft (2), a safety member (61 65) operated by the mechanician and operating the mobile member in such manner as to prevent the displacement of said member under the influence of centrifugal force, the apparatus being thus out of action, or on the contrary to free said mobile member (22) and let it act freely under the influence of centrifugal force.

11. In an automatic coupling between a driving shaft (1) and a driven shaft (2), a first sun wheel (6) fast with the driving shaft (1), a second sun wheel (7) fast with the driven shaft (2), planet wheels (55¹ 55²) interposed between said sun wheels (6 7), a mobile member (22) fast in rotation with said planet wheels and displacing under the influence of centrifugal force, a stopping member (24) locking said mobile member on its displacement under the influence of centrifugal force, this arrangement effecting progressive entrainment of the driven shaft (2) by the driving shaft (1) in accordance with the displacement and locking of the mobile member (22) under the influence of centrifugal force, the complete locking of said mobile member corresponding to direct engagement between the driving shaft (1) and the driven shaft (2), a safety member operated by the mechanician, said member being constituted by a mobile disc (67²) with a returning spring (70), an abutment finger (65) operated by said mobile disc (67²), said abutment finger (65) controlling the mobile member in such manner as to prevent displacement of said mobile member under the influence of centrifugal force, the apparatus being thus out of action, or on the contrary to free said mobile member (22) and let it act freely under the influence of centrifugal force.

12. In an automatic coupling between a driving shaft (1) and a driven shaft (2), a first sun wheel (6) fast with the driving shaft (1), a second sun wheel (7) fast with the driven shaft (2), planet wheels (55¹ 55²) interposed between said sun wheels (6 7), a mobile member (22) fast in rotation with said planet wheels and displacing under the influence of centrifugal force, a stopping member (24) locking said mobile member on its displacement under the influence of centrifugal force, this arrangement effecting the progressive entrainment of the driven shaft (2) by the driving shaft (1) in accordance with the displacement and locking of the mobile member (22) under the influence of centrifugal force, the complete locking of said mobile member corresponding to direct engagement between the driving shaft (1) and the driven shaft (2), a mobile disc (67²) with returning springs (70) operated by the mechanician, an abutment finger (65) in engagement with the mobile member (22) of each planet wheel, an articulated transmission (61, 66¹, 66²) interposed between the mobile disc and the abutment finger (65), the mobile disc thus operating the mobile member in such manner either to prevent displacement of said mobile member under the influence of centrifugal force, the apparatus being thus out of action, or on the contrary to free said mobile member (22) and let it act freely under the influence of centrifugal force.

In testimony whereof I have signed this specification.

PAUL JOSEPH THOMAS.